United States Patent [19]

Leach

[11] 4,010,844

[45] Mar. 8, 1977

[54] MATERIAL HANDLING CONVEYOR LOADER

[76] Inventor: John Meredith Leach, P.O. Box 341, Port Jefferson, N.Y. 11777

[22] Filed: Jan. 27, 1975

[21] Appl. No.: 544,419

[52] U.S. Cl. .................................. 198/562; 193/30
[51] Int. Cl.$^2$ ......................................... B65G 47/19
[58] Field of Search ................. 214/17 B, 41, 42 R; 198/177, 562; 141/387, 388; 193/30

[56] References Cited

UNITED STATES PATENTS

| | | | |
|---|---|---|---|
| 3,266,621 | 8/1966 | Leach ................................ | 198/177 |
| 3,374,908 | 3/1968 | Giesking .......................... | 214/42 R |
| 3,707,998 | 1/1973 | Dalrymple .................... | 214/17 B X |
| 3,799,223 | 3/1974 | Feneziani ........................ | 193/30 X |

*Primary Examiner*—Robert G. Sheridan

[57] ABSTRACT

A bulk material handling conveyor comprising an overhead conveyor which supports containers in the form of magazines for the material. Each magazine has a filling opening surrounded by a gasket, and a movable closure for the filling opening which in closed position covers the filling opening and coacts with the gasket to tightly seal the magazine against leakage from within and without. A filling spout is located adjacent the path of travel of the magazines and comprises a fixed section and a movable section. The fixed section is suitably supported and the movable section has means for moving it from a position where it is out of the way of the movable closure to a position where it tightly contacts said gasket and covers said filling opening to completely prevent any escape of material and dust during the filling operation. A vent is associated with the filling spout to allow air to escape from the magazine during filling.

4 Claims, 2 Drawing Figures

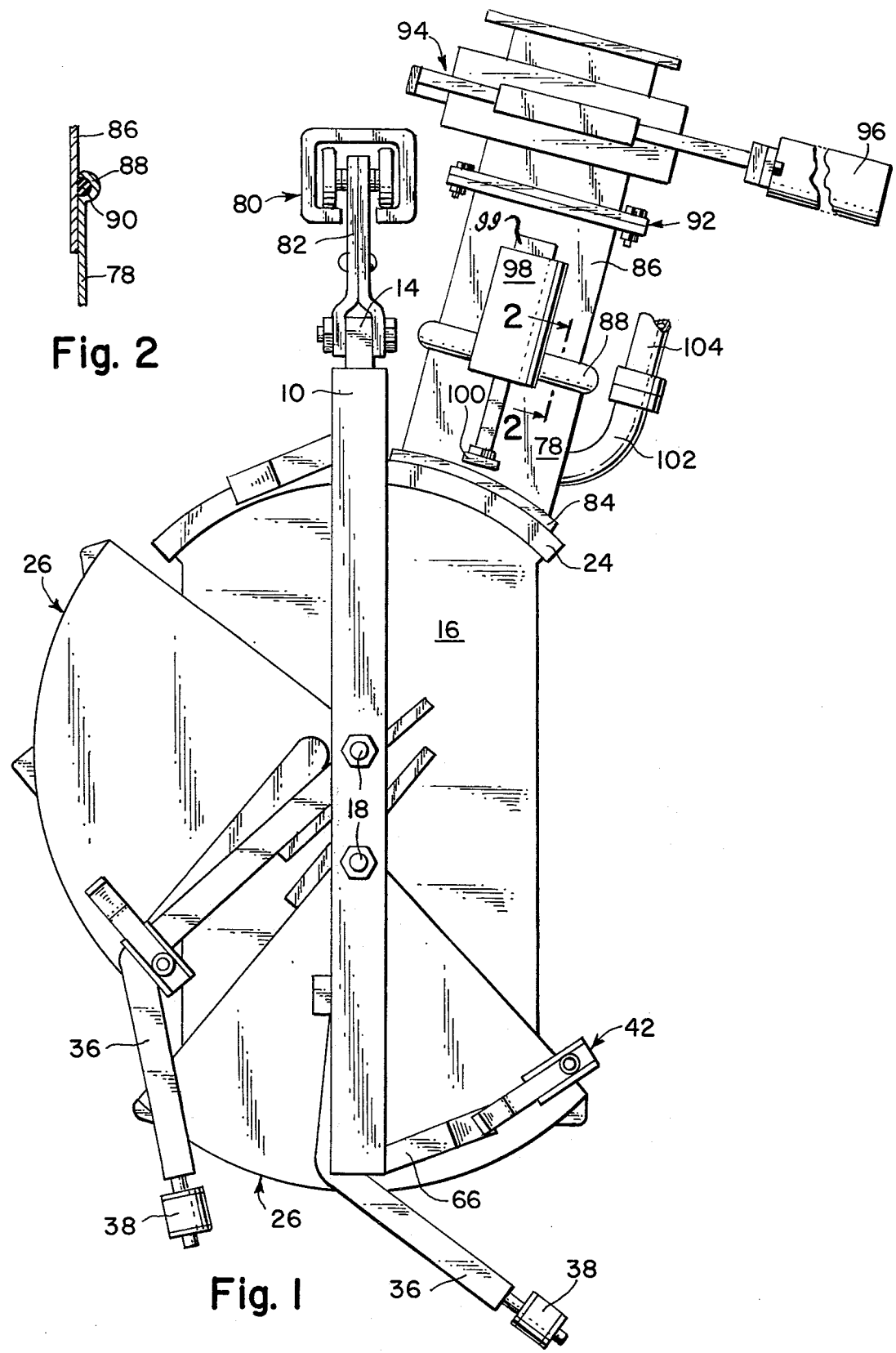

MATERIAL HANDLING CONVEYOR LOADER

BACKGROUND OF THE INVENTION

This invention relates to bulk material handling conveyors of the type wherein closed containers in the form of magazines which hold the material being conveyed and are themselves conveyed by a flexible multiplane and direction conveyor such, for example as an overhead conveyor. This type of invention is best exemplified by U.S. Pat. No. 3,266,621 on which the present invention is an improvement. All of the objects and advantages of the invention stated in that patent apply with equal force and accuracy to the present invention.

SUMMARY OF THE INVENTION

The object of the present invention is to provide a loader or filling spout for the magazines of a conveyor such as that disclosed by the above identified patent. The filling spout must be capable of operating very rapidly and without causing any spillage of the material or creating any dust. It must be further capable of not dribbling any material or releasing any dust when it is not engaged in a filling operation. Other objects and advantages of the present invention will become obvious to those skilled in the art upon recourse to the following specification and claims.

BRIEF DESCRIPTION OF THE DRAWINGS

The now preferred embodiment of the present invention is disclosed in the accompanying drawings and specification which are to be construed as descriptive and not limitative as many changes and modifications can be made in the structural details without departing from the spirit of the invention. In the drawings:

FIG. 1 is an end view of a preferred type of magazine in position to be filled by a filler spout shown in the upper right hand section of the figure.

FIG. 2 is a fragmentary sectional view taken substantially on the plane indicated by line 2 — 2 of FIG. 1 and looking in the direction of the arrows.

DETAILED DESCRIPTION

The type of magazine shown in FIG. 1 is fully disclosed in Application Ser. No. 483,250, filed June 26, 1974 now U.S. Pat. No. 3,934,710. It consists of a rectangular shell 16 open at the top and bottom and provided with a sealing gasket around each of the openings and a movable closure 26 for each of the openings which is moved by a lever 36 releasably locked to its closure by a latch 42. Each lever 36 is provided with a roller 38. Each latch 43 is released by a fixed cam 66. The shell 16 is fastened to an inverted fork 10 at each end by a pair of bolts 18 and the fork has plates 14 which are attached to the pendants 82 of an overhead conveyor 80.

The loader comprises an extensible spout formed of a fixed section 86 and a movable section 78 which is slidable on the fixed section 86. These sections are rectangular in cross section so as to extend along the full length of the opening in the top of the shell 16. The section 78 has an expansion 88 which encloses an O-ring 90 which acts as a gasket to prevent the escape of dust between the two sections all as shown in FIG. 2. The section 78 has a bottom flange 84 which fits tightly against the magazine gasket 24 when the section 78 is in the lowered position shown in FIG. 1 and thus makes a dust tight connection with the magazine. At each of its opposite ends the spout is provided with an air cylinder 98 which is supported by a bracket 99 attached to the fixed section 86 and has its rod attached to a bracket 100 attached to the movable section 78. Thus the two air cylinders 98 can move the section 78 into tight contact with the gasket 24 or raise the movable section 78 up out of the way of the closure 26.

The fixed section 86 is bolted at 92 directly to a gate valve 94 or to a feeder (not shown) so as to provide support for the spout assembly. The valve 94 is actuated by an air cylinder 96 and is disclosed in full detail in application Ser. No. 485,108, filed July 2, 1974 U.S. Pat. No. 3,906,992. The feeder is shown in full detail by U.S. Pat. No. 3,342,307.

A vent pipe 102 is connected so as to open into the movable section 78 at a point so that the opening will be closed by the bottom of fixed section 86 when the fixed section is raised by the air cylinders 98, thereby forming a valve for effectively closing the outlet of the vent pipe 102. The vent pipe 102 is connected to a flexible tubing 104 which will permit the movement of section 78 and the tubing is suitably vented into the top of the storage bin for the material (not shown) or into some other piece of equipment such as a mixer or blender or to the atmosphere. The vent will allow the air displaced by the material as it enters the magazine to be exhausted so that it will not impede the flow of the material into the magazine which must be very rapid.

When an even higher rate of magazine filling is desired a second loader can be placed over the left side of the magazine opening as shown in FIG. 1 which in all respects will be the same as the right loader shown except that it will be a mirror image.

When a second loader is used the closure 26 will open to the degree shown but when only one loader is used closure 26 will be opened only sufficiently to allow room for the one loader. If desired, under such conditions the opening in the magazine can be reduced to just accomodate the one loader and the closure 26 can also be reduced in size to just cover the smaller opening.

In the operation of the loader, when a magazine is moved under the loader by the conveyor 80, the closure will be opened, for example as declosed in U.S. Pat. No. 3,266,621, the conveyor 80 will stop, the section 78 will be moved into dust-tight contact with the gasket 24, the valve 94 will open and the magazine will fill with material for the selected time, the valve 94 will then close and the section 78 will be raised, the conveyor 80 will start and move the just filled magazine away, its closure 26 will be closed, an empty magazine will move into place under the loader and the cycle will be repeated indefinitely until manually discontinued.

During the filling operation no material or dust can escape from the loader and during movement of the magazines there is no material or dust in the chute assembly to dribble out and none can escape from the vent 102 because it is closed at that time by the lower part of section 86. This results in an immaculate operation throughout.

The various operations described above will be performed by electrical controls and circuitry well known in the art so that a detailed description will not be given but reference is made to U.S. Pat. No. 3,342,307 for disclosure of a typical control application. The unobstructed, smooth interior of the extendable chute of the present invention enables all of the material to flow freely into the magazine so that there is no residue to dribble out onto areas beneath it when the space between magazines is passing under the chute.

The invention having been described, what is claimed is:

1. A bulk material handling system comprising a supporting conveyor, material holding magazines supported at intervals by said conveyor and each having a filling opening therein, a gasket carried by each of said magazines and surrounding its said filling opening, a movable closure carried by each of said magazines for its said filling opening, means for moving said closure from a closed position wherein it covers said opening and coacts with said gasket to form a completely dust-free enclosure for said magazine to prevent the escape of any material from or entrance of any substance into said magazine, to an open position wherein said opening is exposed, an extensible filling spout for said magazine comprising a fixed section and a movable section, means for supporting said fixed section, means for moving said movable section from a position where it is out of the way of said closure to a position where it tightly contacts the same said magazine gasket and covers said filling opening to completely prevent any escape of material and dust during the magazine filling operation, and means for driving said conveyor intermittently to move each of said magazines into filling position, stop each of them until filled and then move each filled magazine ahead and at the same time move the next empty magazine into filling position, and repeat this cycle indefinitely.

2. A bulk material handling system as specified in claim 1 in which said spout sections are telescoping.

3. A bulk material handling system as specified in claim 1 in which said extensible spout includes a valve for venting air from the said magazine as it is filled with material.

4. A bulk material handling system as specified in claim 2 in which said movable section is provided with an opening in communication with the interior of said magazine while it is being filled, a vent tube extending from said opening, and said opening being in a position so that it is closed by the fixed section when said movable section is in a raised non-filling position.

* * * * *